United States Patent
Bates et al.

(10) Patent No.: US 8,230,413 B2
(45) Date of Patent: Jul. 24, 2012

(54) DETECTING INCORRECT VERSIONS OF FILES

(75) Inventors: Cary Lee Bates, Rochester, MN (US); Paul W. Buenger, Eau Claire, WI (US)

(73) Assignee: International Business Machines Corporation, Armonk, NY (US)

(*) Notice: Subject to any disclaimer, the term of this patent is extended or adjusted under 35 U.S.C. 154(b) by 2187 days.

(21) Appl. No.: 10/821,146

(22) Filed: Apr. 8, 2004

(65) Prior Publication Data

US 2005/0235010 A1    Oct. 20, 2005

(51) Int. Cl.
 G06F 9/44    (2006.01)
 G06F 9/45    (2006.01)
 G06F 3/00    (2006.01)

(52) U.S. Cl. ........ 717/166; 717/120; 717/140; 717/162; 719/332

(58) Field of Classification Search ........................ None
 See application file for complete search history.

(56) References Cited

U.S. PATENT DOCUMENTS

| | | | |
|---|---|---|---|
| 5,974,428 A * | 10/1999 | Gerard et al. ................. | 717/170 |
| 6,415,435 B1 * | 7/2002 | McIntyre ....................... | 717/108 |
| 6,442,753 B1 * | 8/2002 | Gerard et al. ................. | 717/170 |
| 6,507,948 B1 * | 1/2003 | Curtis et al. .................. | 717/174 |
| 6,658,421 B1 * | 12/2003 | Seshadri ....................... | 717/140 |
| 6,738,977 B1 * | 5/2004 | Berry et al. ................... | 719/332 |
| 6,826,750 B1 * | 11/2004 | Curtis et al. .................. | 717/170 |
| 6,842,897 B1 * | 1/2005 | Beadle et al. ................. | 718/1 |
| 7,127,707 B1 * | 10/2006 | Mishra et al. ................. | 717/137 |
| 7,137,112 B2 * | 11/2006 | Lovvik et al. ................. | 717/166 |
| 7,283,991 B1 * | 10/2007 | Kimmerly ...................... | 717/166 |
| 7,398,523 B2 * | 7/2008 | Martin et al. ................. | 717/166 |
| 7,533,389 B2 * | 5/2009 | Verbeke et al. ............... | 719/332 |
| 7,603,666 B2 * | 10/2009 | McPherson et al. .......... | 717/166 |
| 7,721,276 B2 * | 5/2010 | Lwo ............................... | 717/166 |
| 7,788,660 B2 * | 8/2010 | Chinnappa et al. ........... | 717/166 |
| 7,937,717 B2 * | 5/2011 | Janes et al. ................... | 719/332 |
| 8,001,541 B2 * | 8/2011 | Corrie ........................... | 717/166 |
| 2002/0188935 A1 * | 12/2002 | Hertling et al. ............... | 717/170 |
| 2004/0015936 A1 * | 1/2004 | Susarla et al. ................ | 717/166 |
| 2005/0188356 A1 * | 8/2005 | Lwo ............................... | 717/120 |
| 2006/0070051 A1 * | 3/2006 | Kuck et al. .................... | 717/162 |
| 2007/0061794 A1 * | 3/2007 | Mausolf et al. ............... | 717/162 |
| 2007/0198974 A1 * | 8/2007 | Branda et al. ................. | 717/166 |

OTHER PUBLICATIONS

Yu et al., The security problem of nested classes, Mar. 2000, 5 pages, <http://delivery.acm.org/10.1145/360000/351171/p34-li.pdf>.*
Newsome et al., Proxy compilation of dynamically loaded Java classes with MoJo, Jul. 2002, 9 pages, <http://delivery.acm.org/10.1145/520000/513863/p204-newsome.pdf>.*
Qian et al., A formal specification of Java class loading, Oct. 2000, 12 pages, <http://delivery.acm.org/10.1145/360000/353193/p325-qian.pdf>.*

* cited by examiner

Primary Examiner — Thuy Dao
(74) Attorney, Agent, or Firm — Owen J. Gamon

(57) ABSTRACT

A method, apparatus, system, and signal-bearing medium that in an embodiment issue a warning if a file to be used is an older version. In an embodiment, the warning includes an identification of the location of a newer version of the file. In an embodiment, the file is a class, and the old and new versions are found using a classpath, but in other embodiments any type of file or other object may be used. In this way, the use of incorrect versions of files may be detected and avoided.

6 Claims, 6 Drawing Sheets

DETECTING INCORRECT VERSIONS OF FILES

FIELD

An embodiment of the invention generally relates to computer software. In particular, an embodiment of the invention generally relates to detecting incorrect versions of files.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware (such as semiconductors, integrated circuits, programmable logic devices, programmable gate arrays, and circuit boards) and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

As the sophistication and complexity of computer software increase, the more difficult the software is to debug. Bugs are problems, faults, or errors in a computer program. Locating, analyzing, and correcting suspected faults in a computer program is a process known as "debugging." Typically, a programmer uses another computer program commonly known as a "debugger" to debug a program under development.

Conventional debuggers typically support two primary operations to assist a computer programmer. A first operation supported by conventional debuggers is a "step" function, which permits a computer programmer to process instructions (also known as "statements") in a computer program one-by-one and see the results upon completion of each instruction. While the step operation provides a programmer with a large amount of information about a program during its execution, stepping through hundreds or thousands of program instructions can be extremely tedious and time consuming and may require a programmer to step through many program instructions that are known to be error-free before a set of instructions to be analyzed are executed.

To address this difficulty, a second operation supported by conventional debuggers is a breakpoint operation, which permits a computer programmer to identify with a breakpoint a precise instruction for which it is desired to halt execution of a computer program during execution. As a result, when a computer program is executed by a debugger, the program executes in a normal fashion until a breakpoint is reached. The debugger then stops execution of the program and displays the results of the program to the programmer for analysis.

Typically, step operations and breakpoints are used together to simplify the debugging process. Specifically, a common debugging operation is to set a breakpoint at the beginning of a desired set of instructions to be analyzed and then begin executing the program. Once the breakpoint is reached, the debugger halts the program, and the programmer then steps through the desired set of instructions line-by-line using the step operation. Consequently, a programmer is able to more quickly isolate and analyze a particular set of instructions without needing to step through irrelevant portions of a computer program.

Computer programs being debugged are either compiled for execution by a compiler or executed by an interpreter. One example of an interpreter is the Java Virtual Machine (JVM), which employs a class loader to load classes used by the program being debugged on an as-needed basis. The classpath tells the class loader where to find third-party and user-defined classes. Classpath entries may be directories that contain classes not in a package, the package root directory for classes in a package, or archive files (e.g. .zip or jar files) that contain classes. The class loader loads classes in the order they appear in the classpath. For example, starting with the first classpath entry, the class loader visits each specified directory or archive file attempting to find the class to load. The first class found with the proper name is loaded, and any remaining classpath entries are ignored.

The classpath can become a source of great frustration and annoyance for the user because as the number of dependent third-party and user-defined classes increases for the program being debugged, the classpath becomes a dumping ground for every conceivable directory and archive file, and the risk becomes greater that the class contains duplicate class entries. Thus, the user can experience great difficulty in determining which class the class loader will load first. For example, the user may append a directory to the classpath in attempt to get the latest version of a class loaded into the program being debugged, but the user may be unaware that another version of the class is located in a directory of higher precedence in the classpath.

Without a better way to handle classpaths, the debugging process will continue to be a difficult and time-consuming task, which delays the introduction of software products and increases their costs. Although the aforementioned problems have been described in the context of the Java class loader and programs under debug, they can occur in any compiler or interpreter, in any type of computer language, and in non-debug environments as well as in debug environments.

SUMMARY

A method, apparatus, system, and signal-bearing medium are provided that in an embodiment issue a warning if a file to be used is an older version. In an embodiment, the warning includes an identification of the location of a newer version of the file. In an embodiment, the file is a class, and the old and new versions are found using a classpath, but in other embodiments any type of file or other object may be used. In this way, the use of incorrect versions of files may be detected and avoided.

DETAILED DESCRIPTION

In an embodiment, a debug controller warns the user if a file to be used is an old version and a newer version is available. The warning may include an identification of the location of the newer version of the file. In an embodiment, the file is a class, and the old and new versions are found using a classpath, but in other embodiments any type of file or other object may be used. In this way, the use of incorrect versions of files may be detected and avoided.

Figure 1:
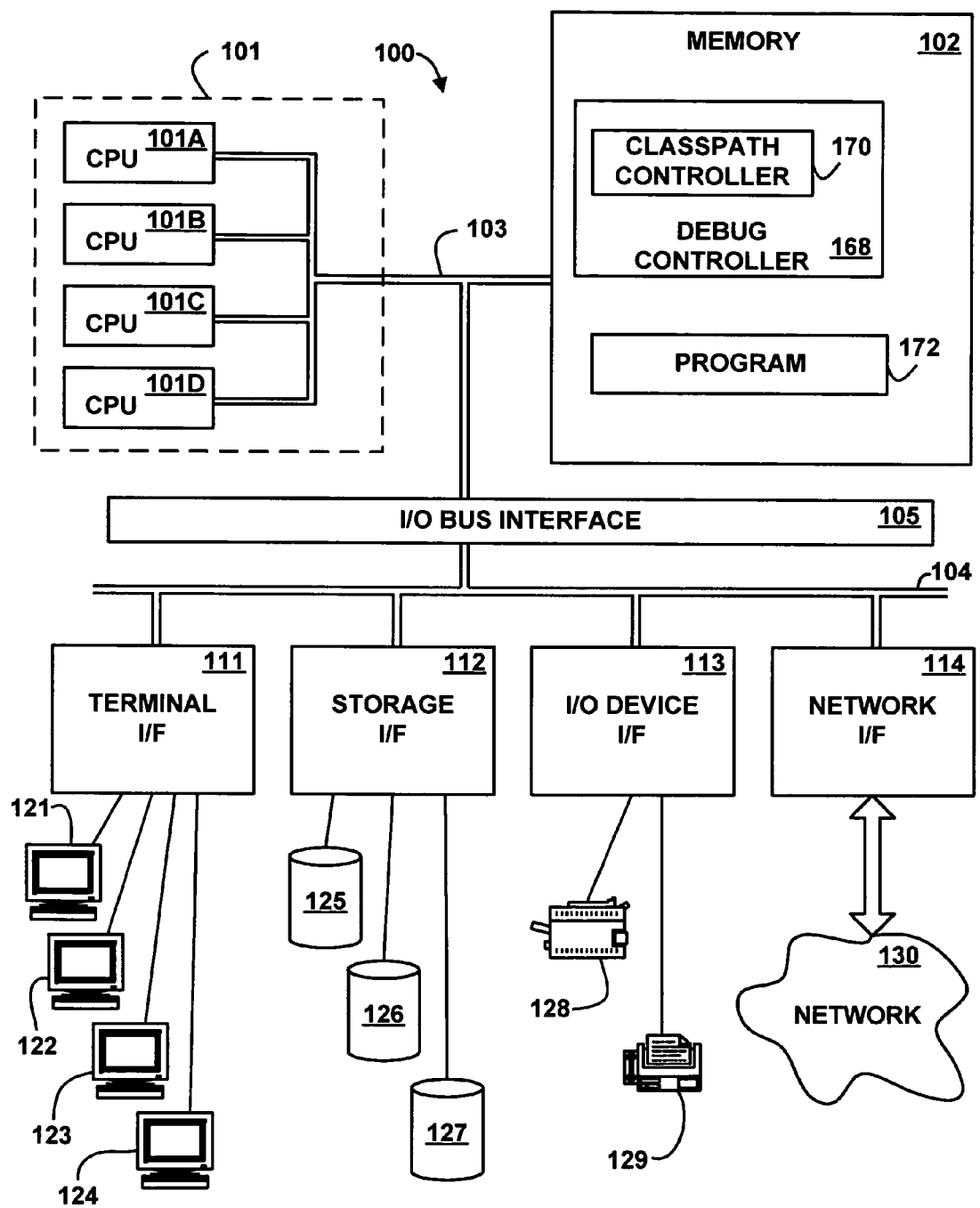
FIG. 1 depicts a block diagram of an example system for implementing an embodiment of the invention.

Referring to the Drawing, wherein like numbers denote like parts throughout the several views, FIG. 1 depicts a high-level block diagram representation of a computer system 100, according to an embodiment of the present invention. The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing data and programs. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may further be distributed and associated with different CPUs or sets of CPUs, as is known in any of various so-called non-uniform memory access (NUMA) computer architectures.

The memory 102 includes a debug controller 168 and a program 172. Although the debug controller 168 and the program 172 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the debug controller 168 and the program 172 are illustrated as residing in the memory 102, these elements are not necessarily all completely contained in the same storage device at the same time.

The debug controller 168 is used to debug the program 172. The debug controller 168 includes a classpath controller 170. In another embodiment, the classpath controller 170 is separate from the debug controller 168. In another embodiment, the classpath controller 170 is implemented as a class loader or as a portion of a class loader that loads classes that may be used by the program 172. In an embodiment, the classpath controller 170 includes instructions capable of executing on the processor 101 or statements capable of being interpreted by instructions executing on the processor 101 to access or communicate with the user interfaces as further described below with reference to FIGS. 2, 3, and 4, and to perform the functions as further described below with reference to FIGS. 5A and 5B. In another embodiment, the classpath controller 170 may be implemented in microcode. In yet another embodiment, the classpath controller 170 may be implemented in hardware via logic gates and/or other appropriate hardware techniques, in lieu of or in addition to a processor-based system.

In an embodiment, the program 172 includes instructions or statements capable of being interpreted or compiled to execute on the processor 101. The program 172 may be debugged by the debug controller 168.

The memory bus 103 provides a data communication path for transferring data among the processors 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI (Peripheral Component Interconnect) bus, or any other appropriate bus technology. The I/O interface units support communication with a variety of storage and I/O devices. For example, the terminal interface unit 111 supports the attachment of one or more user terminals 121, 122, 123, and 124.

The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). Various portions of the contents of the DASD 125, 126, and 127 may be loaded and stored from/to the memory 102 as needed.

The I/O and other device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, etc. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol). In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

It should be understood that FIG. 1 is intended to depict the representative major components of the computer system 100 at a high level, that individual components may have greater complexity that represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the computer system 100, and that, when read and executed by one or more processors 101 in the computer system 100, cause the computer system 100 to perform the steps necessary to execute steps or elements embodying the various aspects of an embodiment of the invention.

Moreover, while embodiments of the invention have and hereinafter will be described in the context of fully functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the computer system 100 via a variety of signal-bearing media, which include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127) or diskette; or (3) information conveyed to the computer system 100 by a communications medium, such as through a computer or a telephone network, e.g., the network 130, including wireless communications.

Such signal-bearing media, when carrying machine-readable instructions that direct the functions of the present invention, represent embodiments of the present invention.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
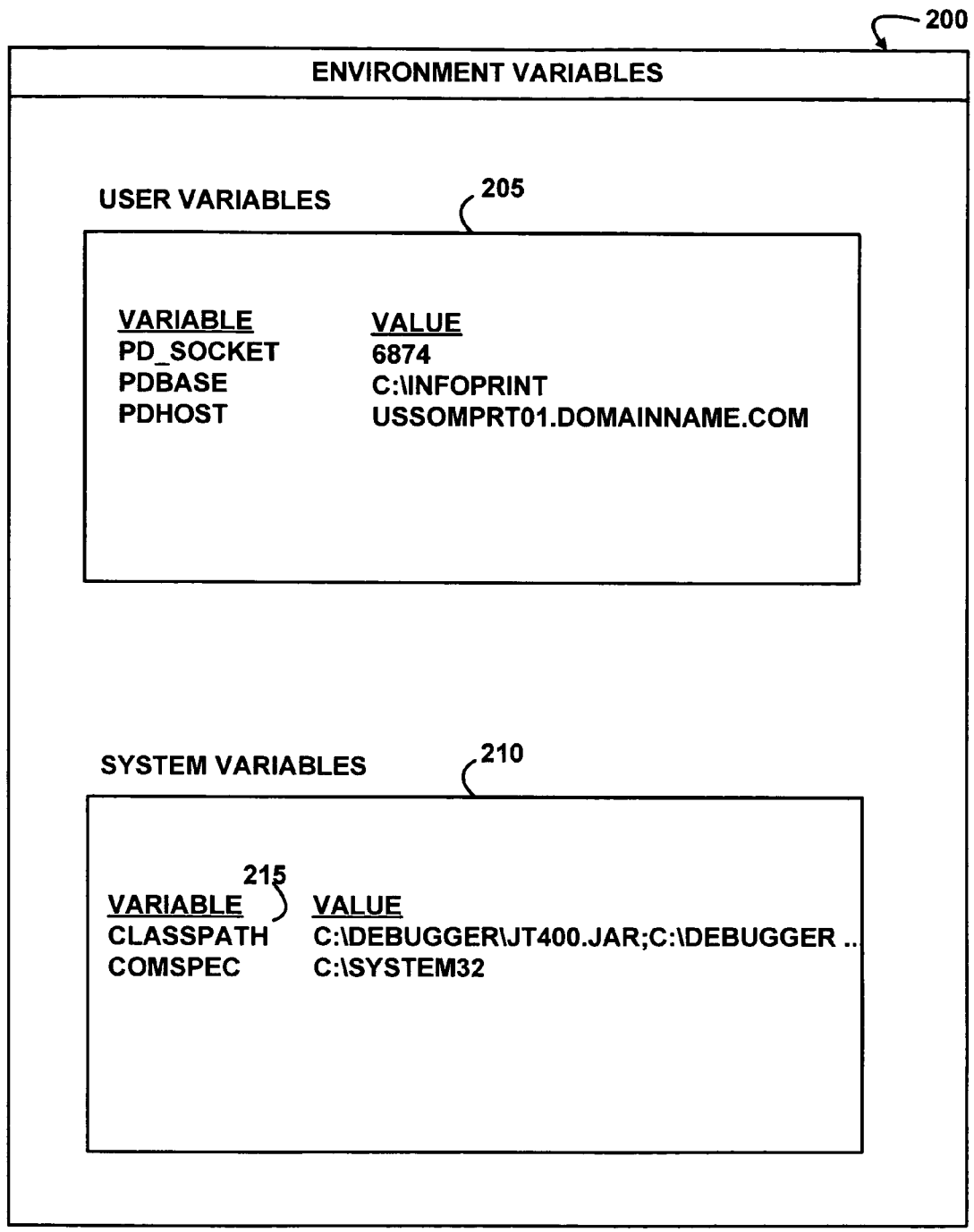
FIG. 2 depicts a pictorial representation of an example user interface for accessing a classpath, according to an embodiment of the invention.

FIG. 2 depicts a pictorial representation of an example user interface 200 for accessing a classpath, according to an embodiment of the invention. The user interface 200 includes a user variables dialog 205 and a system variables dialog 210. One of the system variables is a classpath 215. The classpath 215 includes any number of entries that specify to the classpath controller 170 the location or locations to look for third-party and user-defined classes. In another embodiment, the classes are not restricted to third-party or user-defined classes and may be any type of class. In another embodiment, the class path is not restricted to classes and may specify the locations of an object, database, method, program, or any other type of file.

Classpath entries may specify directories, archive files, or any other type of locations. The classpath controller 170 or other class loader loads classes, files, or objects in the order they appear in the classpath. For example, starting with the first classpath entry, the class loader visits each specified directory or archive file attempting to find the class, file, or other object to load. The first class found with the proper name is loaded, and any remaining classpath entries are ignored.

In the example shown, the value of the first entry in the classpath 215 is "c:\debugger\jt400.jar," which indicates the directory and jar file in which the classpath controller 170 will first search for classes. The data and user interface elements illustrated in FIG. 2 are exemplary only, and in other embodiments any appropriate data and user interface elements may be used.

Figure 3:
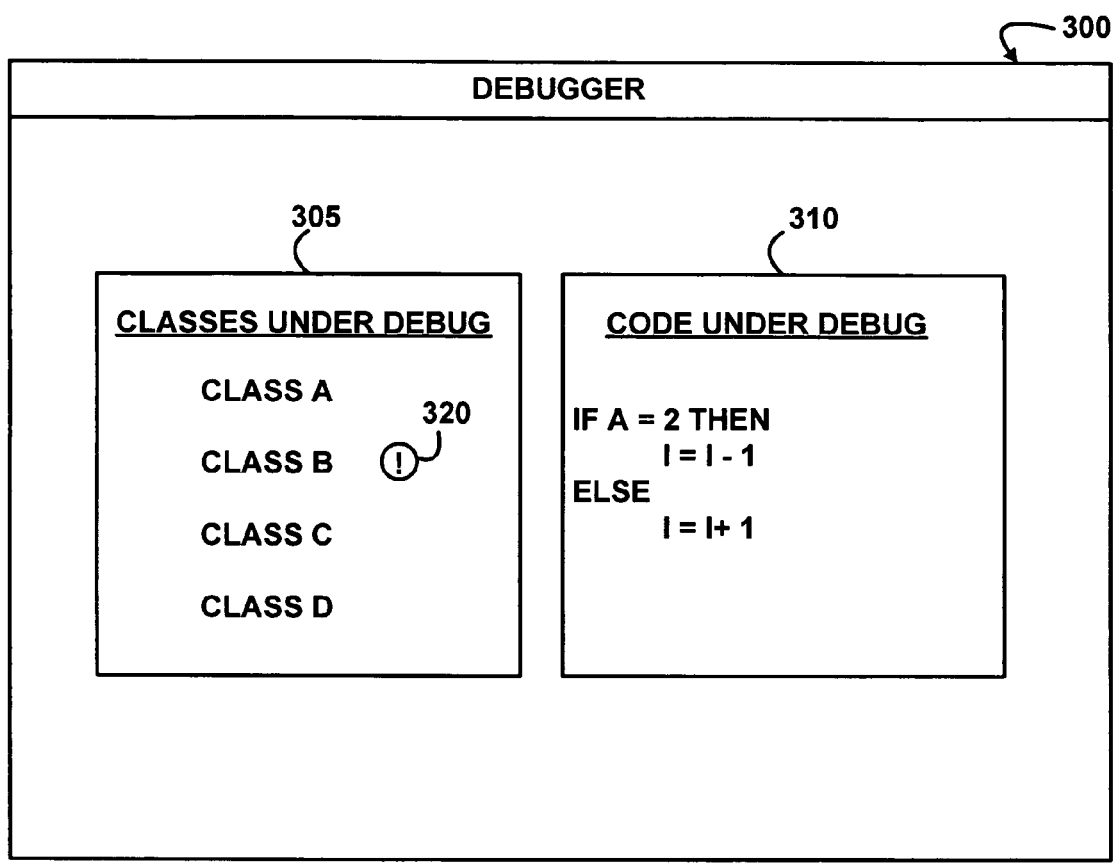
FIG. 3 depicts a pictorial representation of an example user interface for a debug controller, according to an embodiment of the invention.

FIG. 3 depicts a pictorial representation of an example user interface 300 for the debug controller 168, according to an embodiment of the invention. The user interface 300 includes a classes under debug display 305 and a code under debug display 310. The classes under debug display 305 illustrates example classes that are used or are anticipated to be used by the program 172. The icon 320 indicates that the classpath controller 170 suspects that the associated class ("class b" in this example) may be the incorrect version. The classpath controller 170 determines that the associated class may be the incorrect version as further described below with reference to FIGS. 5A and 5B. In response to the user selecting the icon 320, or in response to any other appropriate command or stimulus, the debug controller 168 obtains further information regarding the warning from the classpath controller 170 and displays the user interface of FIG. 4, as further described below. The code under debug display 310 illustrates example contents of the program 172.

Figure 4:
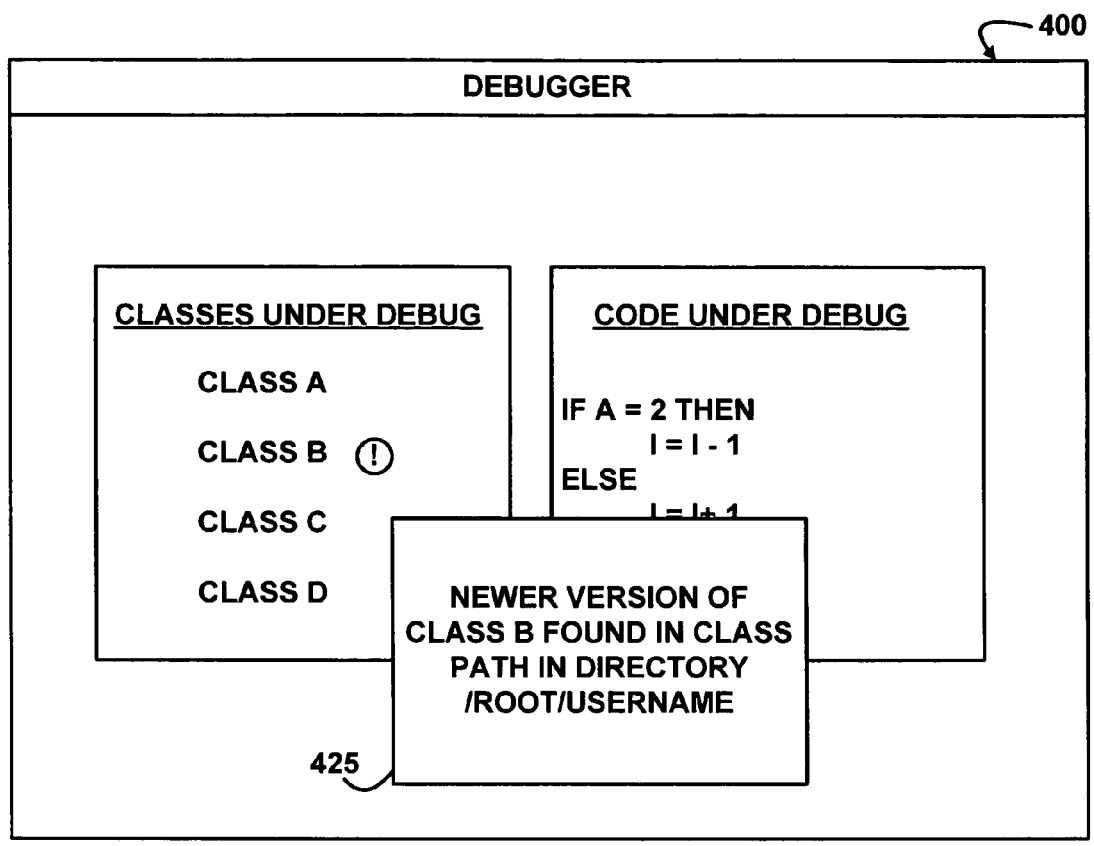
FIG. 4 depicts a pictorial representation of an example user interface for a debugger when providing a notification of a possible classpath error, according to an embodiment of the invention.

FIG. 4 depicts a pictorial representation of an example user interface 400 for the debug controller 168 and the classpath controller 170 when providing a notification of a possible classpath error, according to an embodiment of the invention. In an embodiment, the debug controller 168 displays the user interface 400 in response to the selection of the icon 320 (FIG. 3), displays the user interface 400 automatically in response to detecting a class that may be the incorrect version, or displays the user interface 400 in response to any other appropriate command or stimulus.

The user interface 400 includes a notification 425, which includes more information about the warning 320. The notification 425 indicates that a newer version of one of the classes displayed in the classes under debug display 305 was found. The notification 425 further includes the location of the newer version, which in this example is "/root/username." Although the notification 425 is illustrated as being a popup window, in other embodiments, the notification may be implemented as message, whether text or oral, or any other appropriate notification. Although the warning 320 and the notification 425 are illustrated as being different elements in the user interfaces of FIGS. 4 and 5, in other embodiments, they may both be included in the same element. The data and user interface elements of FIG. 4 are exemplary only, and in other embodiments any appropriate data and user interface elements may be used.

Figure 5A:
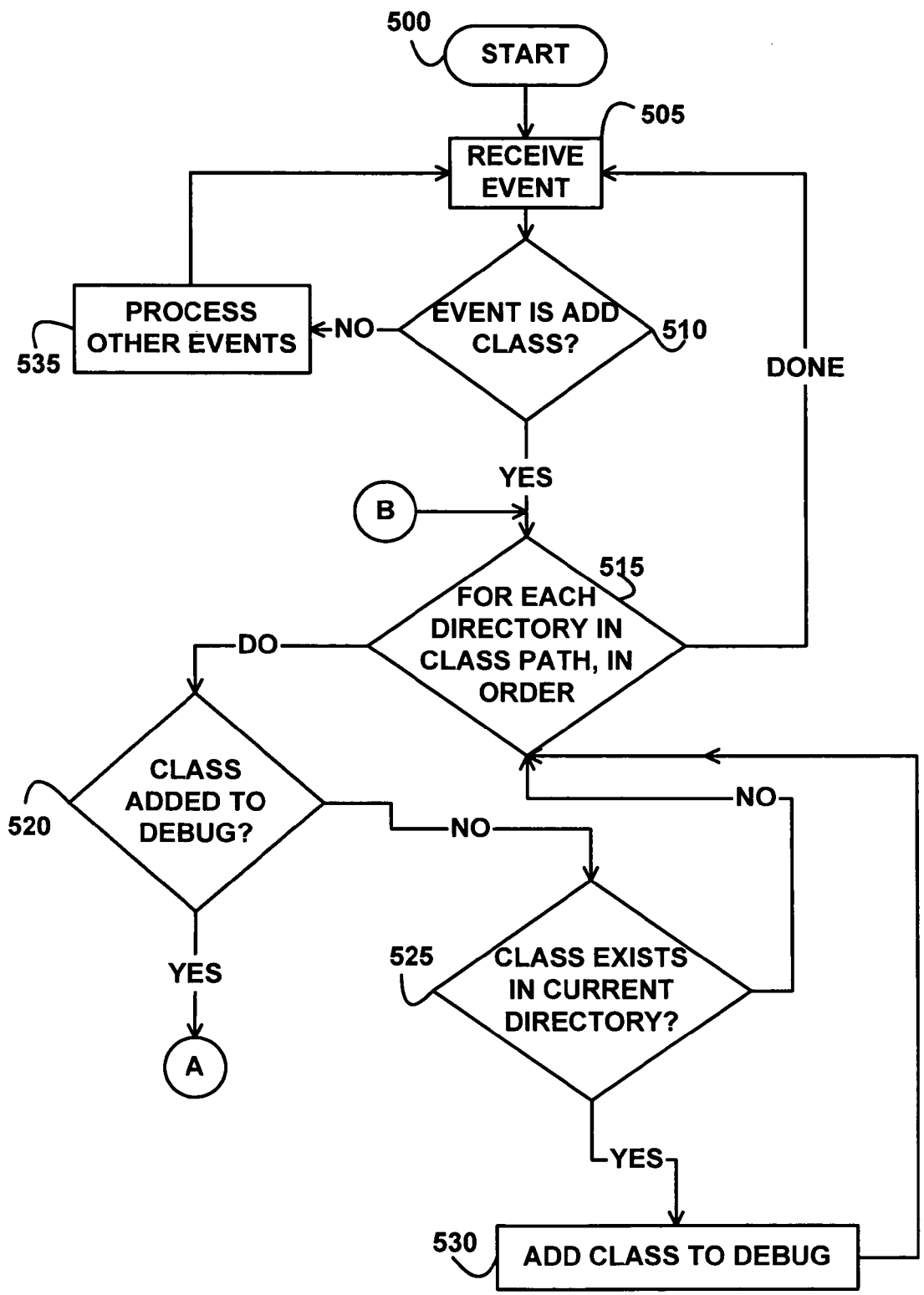
FIG. 5A depicts a flowchart of example processing for a debug controller, according to an embodiment of the invention.
Figure 5B:
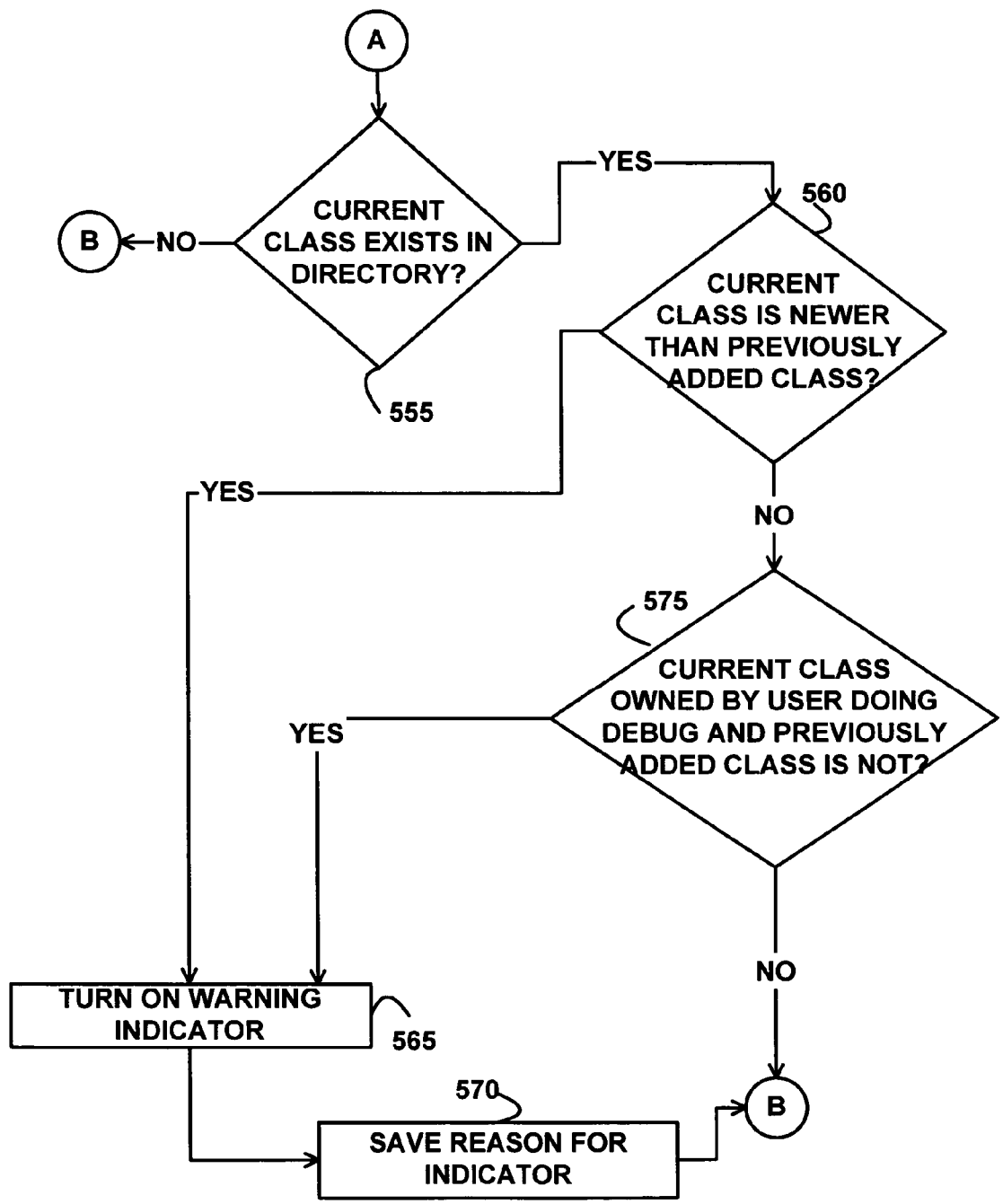
FIG. 5B depicts a flowchart of further example processing for the debug controller, according to an embodiment of the invention.

FIGS. 5A and 5B depict flowcharts of example processing for a classpath controller 170, according to an embodiment of the invention. Control begins at block 500. Control then continues to block 505 where the classpath controller 170 receives an event. Control then continues to block 510 where the classpath controller 170 determines whether the received event is an add class event, indicating that a class is being added to the execution of the program 172.

If the determination at block 510 is true, then the event is an add class event, so control continues to block 515 where the classpath controller 170 begins a loop that is executed for each directory in the classpath 215 in order. So long as there are more directories remaining to be processed by the loop, control continues from block 515 to block 520 where the classpath controller 170 determines whether a class has been added to debug (see block 530, as further described below). If the determination at block 520 is false, then a class has not been added to debug, so control continues to block 525 where the classpath controller 170 determines whether the class being added by the add class event exists in the current directory being processed by the loop.

If the determination at block 525 is true, then the class exists in the current directory, so control continues to block 530 where the classpath controller 170 adds the class to debug (which will cause the later determination at block 520 to be true). Control then returns to block 515, as previously described above.

If the determination at block 525 is false, then the class does not exist in the current directory, so control returns to block 515, as previously described above.

If the determination at block 520 is true, then the class has been added to debug, so control continues from block 520 to block 555 in FIG. 5B where the classpath controller 170 determines whether the current class exists in the current directory of the loop. If the determination at block 555 is true, then the current class exists in the current directory, so control continues to block 560 where the classpath controller 170 determines whether the current class is newer than the class that was previously added to debug (at block 530, as described above). If the determination at block 560 is true, then the current class is newer than the previously-added class, so control continues to block 565 where the classpath controller 170 turns on the warning indicator 320, as previously described above with reference to FIG. 3. In this way, the classpath controller 170 finds a class in a directory that is later in the classpath than the class that was previously added to debug.

Control then continues to block 570 where the classpath controller 170 saves the reason for the warning indicator, which may be later displayed in the notification 425, as previously described above with reference to FIG. 4. Control then returns to block 515, as previously described above.

If the determination at block 560 is false, then the current class is not newer than the previously-added class, so control continues to block 575 where the classpath controller 170 determines whether the current class is owned by the user doing the debug and the previously added class is not owned by the user doing the debug. If the determination at block 575 is true, then control continues to block 565, as previously described above.

If the determination at block 575 is false, then control returns to block 515 in FIG. 5A, as previously described above.

If the determination at block 555 is false, then the current class does not exist in the current directory, so control returns from block 555 to block 515 in FIG. 5A, as previously described above.

When no more directories remain to be processed by the loop that begins at block 515, control returns from block 515 to block 505, as previously described above.

If the determination at block 510 is false, then the received event was not an add class event, so control continues to block 535 where the classpath controller 170 processes other events. Control then returns to block 505, as previously described above.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. Different instances of the word "embodiment" as used within this specification do not necessarily refer to the same embodiment, but they may. The previous detailed description is, therefore, not to be taken in a limiting sense, and the scope of the present invention is defined only by the appended claims.

In the previous description, numerous specific details were set forth to provide a thorough understanding of the invention. But, the invention may be practiced without these specific details. In other instances, well-known circuits, structures, and techniques have not been shown in detail in order not to obscure the invention.

What is claimed is:

1. A method executed by a processor comprising:
   in response to adding a first file to execution of a program that is debugged by a debug controller, finding the first file in a first directory specified in a classpath;
   determining whether a second file later in the classpath from the first file is a newer version than the first file, wherein the determining further comprises determining whether the second file is owned by a user and the first file is not owned by the user, wherein the second file is later in the classpath than the first file; and
   if the second file that is later in the classpath from the first file is the newer version than the first file, issuing a warning, wherein the issuing the warning further comprises issuing the warning if the second file is owned by the user and the first file is not owned by the user.

2. The method of claim 1, wherein the issuing further comprises:
   providing an identification of a location of the newer version of the first file.

3. A storage medium encoded with instructions, wherein the instructions when executed comprise:
   in response to adding a first class to execution of a program that is debugged by a debug controller, finding the first class in a first directory specified in a classpath;
   finding a second class in a second directory, wherein the second directory is later in the classpath than the first directory;
   determining whether the second class is a newer version of the first class;
   deciding whether the second class is owned by a user and the first class is not owned by the user; and
   issuing a warning if the second class in the second directory that is later in the classpath than the first directory is the newer version of the first class, wherein the issuing further comprises issuing the warning if the second class is owned by the user and the first class is not owned by the user.

4. The storage medium of claim 3, further comprising:
   saving a reason for the warning.

5. A computer system comprising:
   a processor; and
   memory encoded with instructions, wherein the instructions when executed on the processor comprise:
      in response to adding a first class to execution of a program that is debugged by a debug controller, finding the first class in a first directory specified in a classpath,
      finding a second class in a second directory, wherein the second directory is later in the classpath than the first directory;
      deciding whether the second class is owned by a user and the first class is not owned by the user;
      determining whether the second class is a newer version of the first class; and
      issuing a warning if the second class in the second directory that is later in the classpath than the first directory is the newer version of the first class in the first directory, wherein the issuing further comprises issuing a warning if the second class is owned by the user and the first class is not owned by the user.

6. The computer system of claim 5, wherein the issuing further comprises:
   providing an identification of the second directory.

* * * * *